United States Patent [19]
Swetland, Jr. et al.

[11] Patent Number: 5,961,894
[45] Date of Patent: Oct. 5, 1999

[54] BLACK LIGHT BUBBLES

[76] Inventors: Wallace Byron Swetland, Jr.; Melody Sue Swetland, both of 12340 Sweetbough Ct., Gaithersburg, Md. 20878

[21] Appl. No.: 09/105,260

[22] Filed: Jun. 26, 1998

[51] Int. Cl.[6] .............................. C09K 3/00; C09K 11/06; F21V 9/04
[52] U.S. Cl. ............... 252/700; 252/301.16; 252/301.33; 252/587; 252/588; 252/589
[58] Field of Search ..................... 252/582, 587, 252/588, 589, 301.16, 301.33, 700

[56] References Cited

U.S. PATENT DOCUMENTS

| | | | |
|---|---|---|---|
| 2,653,109 | 9/1953 | Switzer et al. ......................... | 252/582 |
| 3,037,938 | 6/1962 | Amans ............................... | 252/301.16 |
| 3,676,359 | 7/1972 | Garrett et al. ..................... | 252/301.16 |
| 3,865,073 | 2/1975 | Jahn . | |
| 4,284,534 | 8/1981 | Ehrlich . | |
| 4,511,497 | 4/1985 | Ehrlich . | |
| 4,942,504 | 7/1990 | Brotz . | |
| 5,246,631 | 9/1993 | Halbritter . | |
| 5,298,197 | 3/1994 | Thompson ............................. | 252/700 |
| 5,308,546 | 5/1994 | Hansen et al. ...................... | 252/301.33 |
| 5,849,218 | 12/1998 | Johansen Jr, et al. ............. | 252/301.16 |

OTHER PUBLICATIONS

Chartrand, Sabra, "Chemical Glow Lights Up Bubbles," New York Times, Apr. 7, 1997, at D4.

Kuroda et al., Chemical Abstract 109: 75773 which is an abstract of JP 63–023998, (1988).

*Primary Examiner*—Philip Tucker
*Attorney, Agent, or Firm*—Roy N. Envall, Jr.

[57] ABSTRACT

Bubbles are formed for entertainment and decorative purposes utilizing a liquid solution that includes a sufficient amount of a surface active agent to form the bubbles and a sufficient amount of a flourescent agent to provide illumination of the bubbles when viewed in the dark and under an external source of invisible ultraviolet or infrared radiation, such as a black light. The bubble solution is a pre-mixed, non-toxic solution that includes the surface active agent, or soap, to provide formation of the bubble and a flourescent agent such as Radiant® flourescent pigment dispersions to react to the illumination under the external source of invisible ultraviolet or infrared radiation such as a black light. Alternatively, the solution may be spread on a surface in decorative designs to be illuminated with the black light.

17 Claims, No Drawings

BLACK LIGHT BUBBLES

BACKGROUND OF THE INVENTION

1. Field of the Invention

The present invention relates generally to bubbles that are formed for recreational, demonstrative, and entertainment purposes. Specifically, the present invention relates to providing solutions that may be utilized to illuminate the bubbles in various colors when viewed in the dark and under an external ultraviolet or infrared radiation source, such as a black light.

2. Description of the Prior Art

The formation of bubbles for recreation and entertainment is a well-recognized and widely-practiced past-time. In its simplest form, bubble blowing involves dipping a ring-shaped article into a liquid soap solution followed by blowing into the ring to form one or more bubbles. Alternatively, the ring may be waived or otherwise moved in order to force air through the ring to form the bubbles.

Other methods of forcing air through an article to produce bubbles have been developed. One example involves shaping the article as a child's toy and requiring the operator to move the toy in a particular fashion to produce the bubbles. One such toy is a child's plastic toy lawn mower where the bubble solution is poured into an opening that houses the bubble solution and a fan apparatus and when the child pushes the mower and makes the wheels turn, the fan apparatus inside the mower turns, generating air and producing bubbles.

Bubble solutions for recreational use by children and young adults should be non-toxic and non-irritating to the skin and eyes.

The primary focus of variations to the standard recreational bubble blowing activity has concerned creating new types of articles to house and from which to blow the bubbles. Little success has been achieved in modifying the bubble blowing solution itself to create new and interesting special effects.

One example of a limited approach to creating special-effects bubbles is U.S. Pat. No. 5,246,631 Self-Illuminated Bubbles. This patent embodies a combination of a chemiluminescent agent with a bubble solution to produce bubbles that glow in the dark. Self-Illuminated Bubbles do not, however, illuminate under a black light or other external ultraviolet or infrared radiation source. An additional significant limitation of the Self-Illuminated Bubbles is that the product is delivered in component parts that manually must be prepared prior to blowing the bubbles. The bubble solution must be mixed with the chemiluminescent agent by the consumer immediately prior to use. Requiring the consumer to mix the product is time-consuming and messy. Moreover, young children would need the assistance of an older person to mix the solution before using it.

Two more examples of special effects bubbles, by the same inventor, are U.S. Pat. No. 4,284,534, Aqueous Bubble Blowing Composition, and U.S. Pat. No. 4,511.497. Bubble Composition Using Multipurpose Surfactant Base (hereinafter collectively referred to as "Bubble Compositions"). Bubble Compositions are chemical patents that describe bubble solutions capable of accepting many different additives to produce various special effects, such as long-distance flying bubbles that withstand wind turbulence and evade collision; a stream of 80 to 120 floating bubbles; bubbles that burst with a crackle noise; and colored bubbles that turn into flakes. Bubble Compositions do not embody bubbles that glow under dark conditions. Specifically, Bubble Compositions do not describe bubble solutions that glow under an external ultraviolet or infrared radiation source.

Patents also exist that encompass utilizing flourescent articles and black light illumination for recreational or business uses. These patents, however, do not combine the flourescence and black light with any kind of bubble solution and are not targeted toward a young audience.

U.S. Pat. No. 4,942,504. Electrostatic Display Device, claims a cylindrical light display containing floating flourescent particles that are illuminated by a black light. The field of the Electrostatic Display Device is decorative light displays. The device claims a viewing chamber made with electrostatic plates on the top and bottom and the plates contain opposite electric charges. The viewing chamber contains electrostatically charged flourescent particles and a black light is used in the chamber to illuminate the flourescent particles. The flourescent particles are attracted to one of the electrostatic plates and when they come into contact with that they are repelled and are attracted to the oppositely charged electrostatic plate. This process continues and produces flourescent particles illuminated by a black light that move back and forth within the chamber.

The Electrostatic Display Device describes a decorative light display where the decorative light is viewed in a chamber. The black light bubbles invention does not limit its display to a viewing chamber. The bubble solution may be observed by a much larger audience—anyone within the vicinity of the bubbles, whether in a room in out of doors. The Electrostatic Display Device will not work without the viewing chamber because the flourescent particles will not move without the electrostatic plates. The black light bubbles solution would not react to the electrostatic plates and, in fact, would burst prematurely in the chamber.

U.S. Pat. No. 3,865,073, Material Marking Apparatus, claims the use of a liquid pen containing flourescent ink that is used to mark material, such as a towel, and the markings illuminate under a black light. The markings may indicate locations to cut while sewing for example. The benefit of the pen's flourescent ink is that it is invisible on the material unless placed under a black light. Consequently, the material may be marked without being marred.

The Material Marking Apparatus uses flourescence to facilitate a business purpose and does not describe the use of flourescent articles and black light illumination for recreational or entertainment purposes. Nor does the Material Marking Apparatus patent suggest or implicate combining the flourescent particles with a bubble solution. A primary advantage of the Material marking Apparatus patent is that the ink is invisible so that no one generally will see the markings. Alternatively, one goal of the black light bubbles solution is to illuminate the bubbles so that many persons may observe and be entertained by them.

3. Object and Advantages of the Invention

While the field of using bubble solutions for entertainment and recreational purposes is saturated with products that are used to form the bubbles from a basic soapy bubble solution, little progress has been made in the area of modifying the bubble solution itself, rather than the bubble blowing product, to produce a varied form of bubble entertainment. Of the few inventions that have modified the bubble solution itself to create special effects bubbles, none contemplate bubbles that will glow in the dark under an external ultraviolet or infrared radiation source, such as a black light.

The current invention, the black light bubbles solution, is directed to a method of forming bubbles that glow in various colors when viewed in the dark and under an ultraviolet or infrared radiation source, such as a black light. The black light bubbles solution achieves its glowing effect through flourescence. The invention comprises a bubble solution combined with a flourescent agent to provide illumination of the bubbles when viewed under an external source of invisible ultraviolet or infrared radiation. Flourescence is defined as "the emission of electromagnetic radiation, especially of visible light, resulting from the absorption of incident radiation and persisting only as long as the stimulating radiation is continued." AMERICAN HERITAGE DICTIONARY, 2nd Edition (1985). In this invention, an external source of invisible ultraviolet or infrared radiation, such as a black light, serves as the incident radiation or stimulating radiation. Consequently, this invention embodies a chemical reaction between the bubble solution containing a flourescent agent with an external radiation source to achieve the glowing effect; or through flourescence.

One example of a limited special-effects bubble solution is U.S. Pat. No. 5,246,631, Self-Illuminated Bubbles. This patent embodies a combination of a chemiluminescent agent with a bubble solution to produce bubbles that glow in the dark. Self-Illuminated Bubbles do not, however, illuminate under a black light or other external ultraviolet or infrared radiation source. Self-Illuminated Bubbles depends on a chemical reaction taking place within the bubble solution itself, after the consumer has mixed together the components parts. to create bubbles that glow in the dark. This chemical reaction takes place between a chemiluminescent agent and the bubble solution through chemiluminescence. Chemiluminescence is defined as, "the emission of light as a result of a chemical reaction at environmental temperatures." AMERICAN HERITAGE DICTIONARY, 2nd Edition (1985). Self-Illuminated Bubbles describes the chemiluminescent agent used to achieve the self-glowing effect as a combination of various chemicals including an oxalate diester, a peroxide, and a flourescer. The oxidate is necessary for the chemiluminescent reaction; the flourescer is required for light emission with each type of flourescer giving off a characteristic color; and the peroxide, or activator, is used to initiate the chemical reaction. No light or color emission is possible without the reactor. Consequently, the invention embodied in Self-Illuminated Bubbles requires a chemical reaction that takes place within the bubble solution itself to achieve the glow-in-the-dark effect; or through chemiluminescence.

Self-Illuminated Bubbles require that the consumer mix the bubble solution with the chemiluminescent agent immediately prior to use. Requiring the consumer to mix the product is time-consuming and messy. Moreover, young children would need the assistance of an older person to mix the solution before using it. Black Light Bubbles is delivered to the consumer pre-mixed and ready for use. The consumer is not required to measure or mix any ingredients.

Two more examples of special effects bubbles are U.S. Pat. No. 4,284,534, Aqueous Bubble Blowing Composition, and U.S. Pat. No. 4,511,497, Bubble Composition Using Multipurpose Surfactant Base (hereinafter collectively referred to as "Bubble Compositions"). Bubble Compositions are chemical patents that describe bubble solutions capable of accepting many different additives to produce various special effects, such as long-distance flying bubble that withstand wind turbulence and evade collision; a stream of 80 to 120 floating bubbles; bubbles that burst with a crackle noise; and colored bubbles that turn into flakes.

Despite the varied special effects suggested in Bubble Compositions, the patents do not describe a special effect wherein the bubble solution will glow in dark conditions. Moreover, Bubble Compositions do not encompass bubbles that glow under an external source of ultraviolet or infrared radiation.

Patents also exist that encompass utilizing flourescent articles and black light illumination for recreational or business uses. These patents, however, do not combine the flourescence and black light with any kind of bubble solution and are not targeted toward a young audience.

U.S. Pat. No. 4,942,504, Electrostatic Display Device, claims a cylindrical light display containing floating flourescent particles that are illuminated by a black light. The field of the Electrostatic Display Device is decorative light displays. The device claims a viewing chamber made with electrostatic plates on the top and bottom and the plates contain opposite electric charges. The viewing chamber contains electrostatically charged flourescent particles and a black light is used in the chamber to illuminate the flourescent particles. The flourescent particles are attracted to one of the electrostatic plates and when they come into contact with that plate, they are repelled and are attracted to the oppositely charged electrostatic plate. This process continues and produces flourescent particles illuminated by a black light that move back and forth within the chamber.

The Electrostatic Display Device describes a decorative light display where the decorative light is viewed in a chamber. The black light bubbles invention does not limit its display to a viewing chamber. The bubble solution may be observed by a much larger audience—anyone within the vicinity of the bubbles, whether in a room in out of doors. The Electrostatic Display Device will not work without the viewing chamber because the flourescent particles will not move without the electrostatic plates. The black light bubbles solution would not react to the electrostatic plates and, in fact, would burst prematurely in the chamber.

U.S. Pat. No. 3,865,073, Material Marking Apparatus, claims the use of a liquid pen containing flourescent ink that is used to mark material, such as a towel, and the markings illuminate under a black light. The markings may indicate locations to cut while sewing, for example. The benefit of the pen's flourescent ink is that it is invisible on the material unless placed under a black light. Consequently, the material may be marked without being marred.

The Material Marking Apparatus uses flourescence in a business setting and does not describe the use of flourescent articles and black light illumination for recreational or entertainment purposes. Nor does the Material Marking Apparatus patent suggest or implicate combining the flourescent particles with a bubble solution. A primary advantage of the Material marking Apparatus patent is that the ink is invisible so that no one generally will see the markings. Alternatively, one goal of the black light bubbles solution is to illuminate the bubbles so that many persons may observe and be entertained by them.

Previous inventors of special effects bubbles have not achieved a combination of bubbles that glow in dark conditions and the use of a black light type of light emission under which to view the bubbles. Moreover. previous inventors who have used flourescence and black light illumination to enhance their products have not applied the technology to entertainment uses directed toward children and young adults and have not combined the technology with recreational bubble solutions. This invention provides a new and unique method of entertainment, demonstration, and recreation using bubbles and flourescence.

SUMMARY OF THE INVENTION

The invention consists of a solution wherein bubbles may be formed utilizing a liquid bubble solution that includes a sufficient amount of a surface active agent to form the bubbles and a sufficient amount of a flourescent agent to provide illumination of the bubbles when viewed in the dark and under an external source of invisible ultraviolet or infrared radiation, such as a black light. Different colored pigment dispersions make up the flourescent agent that will be pre-mixed with the bubble solution to form the various colored black light bubble solutions that a consumer may purchase.

The invention is a pre-mixed solution that includes approximately 75% to 90% of a bubble solution containing the surface active agent, such as soap, to provide formation of the bubble combined with approximately 10% to 25% of a flourescent agent. such as Radiant® flourescent pigment dispersions, to form the chemical illumination reaction under the external source of invisible ultraviolet or infrared radiation such as a black light.

The flourescent agent may be in liquid form, such as the Radiant® WD-4200 Flourescent Pigment Dispersions, and mixed directly with the bubble solution in the amounts stated above to form the black light bubble solution. Alternatively, the flourescent agent may be in powder form, such as powdered Radiant® flourescent pigment dispersions. The powdered pigments may be mixed with various modifiers including, but not limited to, some or all of: a wetting agent, a pigment suspension agent, an anti-foam agent. and an anti-freeze agent, to form a liquid version that may be mixed with the bubble solution in the amounts stated above.

DETAILED DESCRIPTION OF THE INVENTION

The current invention, black light bubble solution, discloses a method of forming bubbles that glow in various colors when viewed in the dark and under an ultraviolet or infrared radiation source. such as a black light. This invention utilizes a bubble solution combined with a non-toxic flourescent agent to provide illumination of the bubbles when viewed under an external source of invisible ultraviolet or infrared radiation.

Flourescence is defined as "the emission of electromagnetic radiation, especially of visible light, resulting from the absorption of incident radiation and persisting only as long as the stimulating radiation is continued." AMERICAN HERITAGE DICTIONARY, 2nd Edition (1985). In this invention, an external source of invisible ultraviolet or infrared radiation. such as a black light, serves as the incident radiation or stimulating radiation. Consequently, this invention requires a chemical reaction between the bubble solution containing a flourescent agent with an external radiation source to achieve the glow-in-the-dark effect; or through flourescence.

The invention is a pre-mixed solution that includes approximately 75% to 90% of a bubble solution containing the surface active agent, such as soap, to provide formation of the bubble combined with approximately 10% to 25% of a flourescent agent, such as Radiant® flourescent pigment dispersions, to form the chemical illumination reaction under the external source of invisible ultraviolet or infrared radiation such as a black light. Different colored pigment dispersions will be pre-mixed with the bubble solution to form the various colored black light bubble solutions that a consumer may purchase.

The flourescent agent may be in liquid form, such as the Radiant® WD-4200 Flourescent Pigment Dispersions, and mixed directly with the bubble solution in the amounts stated above to form the black light bubble solution. Alternatively, the flourescent agent may be in powder form, such as powdered Radiant® flourescent pigment dispersions. The powdered pigments may be mixed with various modifiers including, but not limited to, some or all of: a wetting agent, a pigment suspension agent, an anti-foam agent, and an anti-freeze agent, to form a liquid version that may be mixed with the bubble solution in the amounts stated above.

The preferred embodiment of the black light bubble solution encompasses bubble mixtures that produce various colors when used as indicated. Different flourescent pigment dispersions that produce different colors when viewed under an ultraviolet or infrared radiation source will be pre-mixed with the bubble solution to form the various colored solutions. For example, five liters of bubble solution may be premixed with one liter of blue flourescent pigment dispersions to produce a bubble mixture that will appear in blue when viewed under the external ultraviolet or infrared radiation source. Consumers may purchase the color of their choice from the available colored solutions.

Bubble solutions for use by children and young adults should be non-toxic and non-irritating to skin and eyes. The current invention may be achieved utilizing a child-safe bubble solution with non-formaldehyde flourescent pigments. The preferred embodiment of the black light bubbles solution includes a non-toxic flourescent agent such as Radiant® liquid flourescent pigment dispersions.

Another use of the black light bubbles solution is to spread the solution using, for example, a brush or fingers, without forming bubbles, on a wall, sidewalk, or other surface. Exposure of the solution to an external ultraviolet light source in the dark will illuminate the resulting artistic formation. For example, the black light bubbles solution may be used to decorate rooms by painting objects, such as planets and starts, on the walls and ceilings.

Another special effect that may be achieved with the black light bubbles solution is to view the resulting bubbles after they are formed and when they pop. The solution disburses into small fragments that still are visible under the external ultraviolet or infrared radiation source.

Although the present invention has been described with reference to particular embodiments, it will be apparent to those skilled in the art that variations and modifications may be substituted therefor without departing from the principles and spirit of the invention. Accordingly, the scope of the invention should be determined not by the embodiments illustrated, but by the appended claims and their legal equivalents.

What is claimed is:

1. A liquid bubble solution that includes a sufficient amount of a surface active agent to form bubbles and a sufficient amount of a flourescent agent to provide illumination of the bubbles when viewed in the dark and under an external source of invisible ultraviolet or infrared radiation.

2. A bubble solution according to claim 1 wherein said solution is an aqueous solution.

3. A bubble solution according to claim 2 wherein said surface active agent is a liquid soap.

4. A bubble solution according to claim 3 wherein said surface active agent makes up approximately 75% to 90% of the solution and said flourescent agent makes up approximately 10% to 25% of the solution.

5. A bubble solution according to claim 4 wherein five parts of said surface active agent are combined with one part of said flourescent agent.

6. A bubble solution according to claim 1 wherein said flourescent agent contains a particular pigment dispersion to produce a particular color of bubble.

7. A bubble solution according to claim 6 wherein said pigment dispersions are in liquid form.

8. A bubble solution according to claim 6 wherein said pigment dispersions are in powder form.

9. A bubble solution according to claim 8 wherein said powder pigment dispersions are mixed with modifiers to form a liquid solution appropriate for mixture with said surface active agent.

10. A bubble solution according to claim 9 wherein said modifiers include a wetting agent, a pigment suspension agent, an anti-foam agent, and an anti-freeze agent.

11. A bubble solution according to claim 9 wherein said powder pigment dispersions comprise approximately 45% of the liquid solution and said modifiers comprise approximately 55% of the liquid solution.

12. A bubble solution according to claim 1 wherein the external source of invisible ultraviolet or infrared radiation is an independent external black light source.

13. A bubble solution according to claim 1 wherein said solution is non-toxic.

14. A bubble solution according to claim 1 wherein said solution is spread on a surface and illuminated when viewed in the dark and under an external source of invisible ultraviolet or infrared radiation.

15. A bubble solution according to claim 14 wherein said spreading of the bubble solution produces decorative artistic works.

16. A bubble solution according to claim 1 wherein said bubble solution is used to form bubbles and said bubbles are viewed in the dark and illuminated under an external source of invisible ultraviolet or infrared radiation.

17. A bubble solution according to claim 16 wherein said bubbles are viewed as they burst resulting in bubble fragments visible under said external source of invisible ultraviolet or infrared radiation.

* * * * *